United States Patent
Stefan

(10) Patent No.: US 11,185,122 B2
(45) Date of Patent: Nov. 30, 2021

(54) SKI BOOT ELEMENT

(71) Applicant: ROSSIGNOL LANGE S.R.L., Treviso (IT)

(72) Inventor: Matteo Stefan, Povegliano (IT)

(73) Assignee: ROSSIGNOL LANGE S.R.L., Treviso (IT)

( * ) Notice: Subject to any disclaimer, the term of this patent is extended or adjusted under 35 U.S.C. 154(b) by 160 days.

(21) Appl. No.: 16/004,513

(22) Filed: Jun. 11, 2018

(65) Prior Publication Data

US 2018/0352894 A1 Dec. 13, 2018

(30) Foreign Application Priority Data

Jun. 13, 2017 (FR) ...................................... 1755288

(51) Int. Cl.
| | | |
|---|---|---|
| *A43B 5/04* | (2006.01) | |
| *A43B 1/14* | (2006.01) | |
| *A43B 23/02* | (2006.01) | |
| *B29D 35/00* | (2010.01) | |
| *A43B 5/16* | (2006.01) | |
| *A43B 1/00* | (2006.01) | |
| *B29K 105/16* | (2006.01) | |
| *B29K 75/00* | (2006.01) | |

(52) U.S. Cl.
CPC .......... *A43B 5/0427* (2013.01); *A43B 1/0009* (2013.01); *A43B 1/14* (2013.01); *A43B 5/0482* (2013.01); *A43B 5/0486* (2013.01); *A43B 5/1625* (2013.01); *A43B 23/027* (2013.01); *A43B 23/0215* (2013.01); *B29D 35/0009* (2013.01); *B29K 2075/00* (2013.01); *B29K 2105/165* (2013.01)

(58) Field of Classification Search
CPC ... A43B 5/0427; A43B 5/0401; A43B 5/0409; A43B 5/04; B29K 2105/165
USPC ............................................................ 36/85
See application file for complete search history.

(56) References Cited

U.S. PATENT DOCUMENTS

| | | | |
|---|---|---|---|
| 4,255,202 A | 3/1981 | Swan, Jr. | |
| 4,314,411 A | 2/1982 | Hanson | |
| 4,724,627 A | 2/1988 | Sisco | |
| 5,213,812 A * | 5/1993 | Ruiz | A61K 9/1694 424/499 |
| 5,932,336 A * | 8/1999 | Allen | A43B 5/001 36/28 |
| 6,100,328 A | 8/2000 | Lopez Poy et al. | |
| 2005/0160627 A1* | 7/2005 | Dalgaard | A43B 5/0401 36/50.5 |

(Continued)

FOREIGN PATENT DOCUMENTS

| | | |
|---|---|---|
| WO | 81/02510 A1 | 9/1987 |
| WO | 2016/138113 A1 | 9/2016 |

OTHER PUBLICATIONS

French Search Report and Written Opinion dated Feb. 26, 2018 issued in counterpart application No. FR1755288; w/ English machine translation (16 pages).

*Primary Examiner* — Timothy K Trieu
(74) *Attorney, Agent, or Firm* — Westerman, Hattori, Daniels & Adrian, LLP

(57) ABSTRACT

Sports boot element comprising all or part of a wall designed to form at least part of a lateral and/or frontal and/or rear and/or lower wall of a sports boot, characterised in that all or part of its wall comprises a material (10) comprising a polymer (11) and a hollow microball (12) filler.

18 Claims, 3 Drawing Sheets

(56) References Cited

U.S. PATENT DOCUMENTS

| | | | |
|---|---|---|---|
| 2010/0122476 A1* | 5/2010 | Le | B29D 35/0054 |
| | | | 36/30 R |
| 2012/0246975 A1* | 10/2012 | Wieser | A43B 5/0431 |
| | | | 36/109 |
| 2013/0008050 A1* | 1/2013 | Marc | A43B 17/03 |
| | | | 36/44 |
| 2013/0167404 A1* | 7/2013 | Kaushik | A43B 5/0482 |
| | | | 36/87 |
| 2013/0298427 A1 | 11/2013 | Kaushik et al. | |
| 2014/0157627 A1* | 6/2014 | Smaldone | A43B 5/0415 |
| | | | 36/83 |
| 2015/0230539 A1* | 8/2015 | Bello | A43B 5/0486 |
| | | | 36/115 |
| 2016/0007674 A1* | 1/2016 | Labonte | A43B 3/0078 |
| | | | 36/54 |
| 2017/0058123 A1 | 3/2017 | Sutterlin et al. | |

* cited by examiner

SKI BOOT ELEMENT

This application claims priority of French application No. FR1755288 filed Jun. 13, 2017, which is hereby incorporated herein by reference in its entirety.

TECHNICAL FIELD OF THE INVENTION

The invention relates to a sports boot element comprising at least one plastic wall, such as, for example, all or part of a shell, for example a lower shell, a collar or a tongue, or a sole, in particular of a downhill ski boot, a cross-country ski boot or a hiking ski boot, and a sports boot as such comprising an element of this type. It relates particularly to all or part of a ski boot. It also relates to a process for production of a sports boot element of this type.

PRIOR ART

A ski boot requires firstly substantial strength and rigidity, and secondly a high level of comfort. In fact, a boot of this type is subjected to many forces in use, and consequently must be provided with good strength. A high level of rigidity is also necessary in order to achieve good performance of the boot which, as the intermediary between the skier and the ski, transmits the forces of the skier to the ski in order to guide the latter.

Thus, in the case of a downhill ski boot, the ski boot is often characterised by its flex index, which represents the front to rear flexure properties of the boot. This flex index represents the force necessary to achieve a certain flexure towards the front of the collar relative to the lower shell of a ski boot, and allows the ankle of the user to pivot. Flexure of this type from the rear towards the front, characterised by the flex index, is an important indicator of the performance of a ski boot necessary for the skier in making a reliable choice of boot. The greater the flex index, the more the ski boot will be rigid in front to rear flexure, and therefore reactive and precise. On the other hand, the lower the flex index, the more comfortable the ski boot will be. The choice of flex of a ski boot therefore represents a compromise between these contradictory characteristics, in the knowledge however that the flex is necessarily high for the minimal performance of the ski boot, as previously mentioned. The comfort of the ski boot is achieved by a more flexible inner boot, which attenuates the discomfort induced by the rigid outer shell.

The elements of a ski boot which provide it with its rigidity are generally produced by injection of plastic. In order to increase the rigidity in flexure and/or the flex of the ski boot, the manufacturers can for example thicken the walls of the various elements, such as the shell, the collar, the sole, or the stiffeners (etc.). However, an approach of this type contributes towards increasing the quantity of material used. The increase in the rigidity in flexure and/or the flex of a ski boot then results in obtaining a ski boot which is heavier, more voluminous and more expensive.

In addition, the design and production of ski boots must comply with various requirements or objectives, including:
  the component elements of the ski boot often have a complex geometric form in order to match the form of the foot. Their production by injection of plastic requires great dimensional stability, both for the comfort of the user and for the aesthetic appearance of the ski boot.
  ski boots must be suitable for use in very low temperatures, and therefore provide good thermal insulation.
  ski boots must be able to absorb the energy of an impact in order to protect the foot of its user.
  ski boots must be chemically compatible with the external environment, and in particular the materials of ski boots must be resistant to water.
  finally, ski boots must also be as light as possible in order to be comfortable for the skier during use, when skiing, walking, or during phases of going uphill when hiking.

More generally, control of the property of flexure in the front to rear direction and/or laterally of any sports boot, particularly a somewhat rigid boot for practising a sliding sport, is important. In particular, the flexure index must be high in order to achieve good performance of these boots when practising sport, particularly for a sliding sport, i.e. the structure of the boot must be such that it has strong resistance to the pivoting forwards of the lower leg of a user, mainly in the case of a downhill ski boot.

SUBJECT OF THE INVENTION

The objective of the invention is to provide a sports boot element, which in particular forms all or part of the outer wall of a sports boot, and which eliminates some or all of the disadvantages of the aforementioned prior art, thus improving the known sports boot elements.

In particular, a first objective of the invention is to seek a new solution for optimisation of the front to rear flexure property of a sports boot, in particular in order to optimise the rigidity in flexure of a sliding sports boot, particularly by optimising the flex of a downhill ski boot. In addition, the invention also relates to the optimisation of the flexure in the lateral direction of the boot, or also to the flexure of the sole of the boot.

A second objective of the invention is to seek a solution for a sports boot which makes it possible to achieve an optimal compromise between rigidity, reliability, lightness and cost.

For this purpose, the invention is based on a sports boot element comprising all or part of a wall designed to form at least part of a lateral and/or frontal and/or rear and/or lower wall of a sports boot, characterised in that all or part of its wall comprises a material comprising a polymer and a hollow microball filler.

The said wall comprising a polymer and a microball filler can be a rigid wall.

The said wall can comprise a proportion of microballs of between 5% and 25% inclusive, or between 10% and 15% inclusive, of the weight of the said all or part of the wall of the sports boot element.

The microballs can have a mean diameter of between 15 and 25 µm and/or a density of between 0.30 and 0.60 g/cm³. The microballs can have a resistance to compression of 1000 bars or more, or of 1100 bars or more.

The microballs can be glass microballs or polymer microballs or plastic microballs or ceramic microballs.

The said wall comprising a polymer and a filler of microballs can have a modulus of flexure of 100 MPa or more, and/or can have rigidity greater than, or equal to, the rigidity of an element with the same form constituted only by a polyurethane with a hardness of 45 Shore D.

The polymer can be a thermoplastic polymer, in particular a thermoplastic polyurethane.

The polymer can have a hardness greater than, or equal to, that of a polyurethane with the same form and a hardness equal to 45 Shore D, and/or the polymer can have a hardness of between 50 and 60 Shore D inclusive, and/or the polymer can comprise a modulus of flexure of between 100 and 200 MPa inclusive.

The sports boot element can be designed to contribute to rigidity in flexure of a sports boot, and in particular the element can form all or part of an outer shell, or a lower shell, or a collar, or a tongue of the sports boot.

The sports boot element can form all or part of a boot sole, and/or can form at least one sports boot curb.

The invention also relates to a ski boot, characterised in that it comprises at least one sports boot element as previously described.

The ski boot can comprise a collar which is articulated on a lower shell, and the collar and/or the lower shell can be boot elements as previously described.

The invention also relates to a process for production of a sports boot element as previously described, characterised in that it comprises a step of injection in an injection mould of a material comprising a polymer and a hollow microball filler.

The process for production of a sports boot element can comprise a step of granulation comprising the production of the first material by incorporation of microballs into a polymer, comprising a step of coating of microballs with a layer of the polymer material.

The process for production of a sport boot element can comprise a second step of injection of a second material, different from the first material, in the same injection mould, according to a principle of co-injection or over-injection.

BRIEF DESCRIPTION OF THE DRAWINGS

These objectives, characteristics and advantages of the present invention will be described in detail in the following description of a particular embodiment provided by way of non-limiting example in relation with the appended figures, in which.

DESCRIPTION OF PREFERRED EMBODIMENTS OF THE INVENTION

In the following description, it is assumed that the boot is resting on a horizontal ground. In addition, the outer face of a boot element will denote its surface facing towards the exterior of the boot, and the inner face will denote a surface facing towards the interior of the boot, on the foot side.

Figure 1:
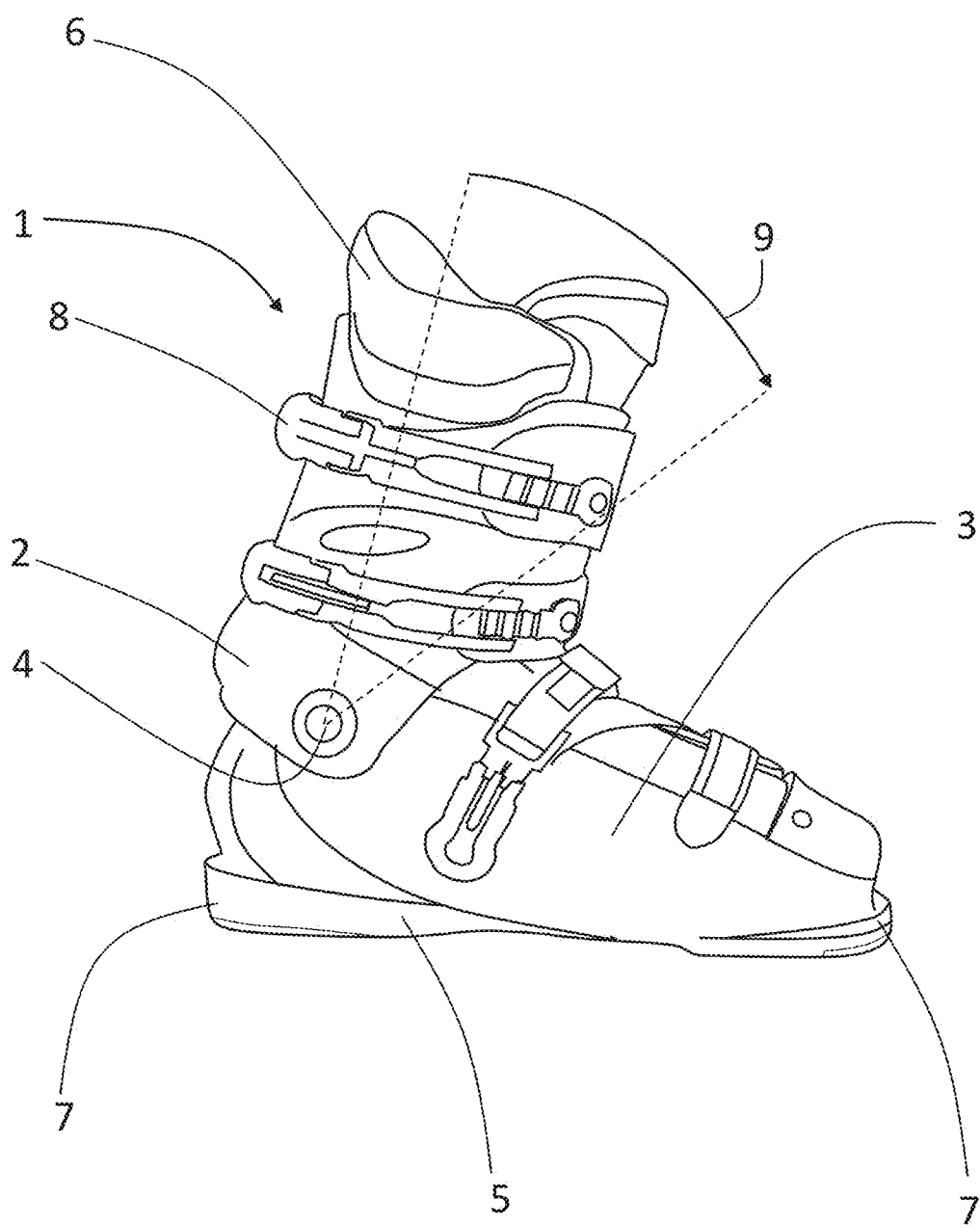
FIG. 1 is a schematic view of a ski boot according to an embodiment of the invention.

FIG. 1 illustrates a ski boot 1 according to an embodiment of the invention. According to this embodiment, the ski boot is designed for practising downhill skiing; as a variant, the invention is implemented for a cross-country ski boot, a hiking ski boot or also a snowboarding boot. The ski boot according to the embodiment comprises a rigid outer shell formed by a plurality of elements obtained by injection of plastic. In particular, the shell comprises mainly two elements, i.e. a collar 2 and a lower shell 3, the collar being articulated on the lower shell 3 around a connection axis forming an axis of articulation 4, positioned substantially at the ankle joint.

The lower shell 3 extends from a walking sole 5 as far as the axis of articulation 4, it has a global form which is designed to surround the foot of a skier, and comprises an opening at the top, at the level of the ankle of a skier. The sole 5 is extended at its two, front and rear ends by curbs 7 with a format designed for cooperation with the jaws of a device for securing of the ski boot. The curb of the sole 5, which is in contact with the ground when walking, can be formed directly in a single piece on the lower shell 3, or it can be added on, for example by using added-on heel pieces, at the front and/or at the rear. The height of the curbs 7 and the general form of the sole is standardised in order to be able to cooperate with the jaws of standard securing devices. The sole 5 and the curbs 7 can therefore not form the basis of adaptation in order to adjust the rigidity of the ski boot. The sole 5 and the curbs 7 are considered to be non-deformable in comparison with the other parts of the ski boot. In downhill skiing, when the boot is engaged in the jaws of the securing devices, the sole extends according to a plane substantially parallel to the plane of the ski.

The collar 2 envelops a lower part of the tibia and the calf of a skier. It extends substantially from the ankle to the bottom of the leg of a skier.

The bottom of the shell 3 and the collar 2 are very rigid, and comprise at least one opening delimiting two flaps positioned on both sides of this opening, which, by being spaced apart, provide an opening of the outer shell which is sufficient to enable a skier to put the ski boot on and take it off. For this purpose, the ski boot also comprises tightening loops 8, arranged on the outer shell, which make it possible to tighten firstly the lower shell against the foot, and secondly the collar against the tibia and the bottom of the leg, by bringing towards one another their aforementioned flaps, in order to keep the rigid outer shell closed around the foot and the bottom of the leg of the skier when he has put on the ski boot.

Finally, according to another embodiment, the rigid outer shell could comprise a tongue extending at the front of the boot, from the top of the lower shell as far as the top of the collar. The use of a tongue of this type in addition to the lower shell and the collar makes it possible for example to design a lower shell and/or a collar which is more open, and thus facilitates the insertion of the foot in the boot.

The rigid outer shell thus forms a boot which surrounds completely the foot and the bottom of the leg of the skier. Since this outer shell is very rigid, an inner comfort boot 6 is inserted in the outer shell, in order to ensure that the skier is comfortable. This inner comfort boot 6 is removable, and the outer shell and the comfort boot ultimately form two distinct, complementary, superimposed boots.

As previously stated, the collar 2 is fitted such as to be mobile in rotation relative to the lower shell 3, around the axis of articulation 4. The connection in rotation nevertheless requires a certain force in order to be activated, since the bottom of the collar is supported on the lower shell. The movement of rotation forwards of the collar thus requires deformations of the lower shell and/or of the collar, which oppose this movement of rotation because of their rigidity. The resistance to the movement of rotation can increase with the amplitude of the rotation. In other words, the force which is necessary in order to incline the collar forwards relative to the lower shell increases as the collar is inclined. Thus, this property of flexure of the ski boot can be characterised by a flexure force necessary in order to incline the collar relative to the lower shell, according to a given orientation 9, illustrated schematically in FIG. 1. The flex index of the ski boot is an indicator of this property of flexure forwards, and represents indirectly an indicator of the aptitude of the boot to transmit the impulses of a skier to a ski. The greater the flex, the more the ski boot will be reactive and precise. The lower shell, the collar (and optionally the tongue when there is one) are elements of the ski boot which contribute particularly to defining its flex, and more specifically the properties of its wall which contribute to defining its flex. In fact, in general, the lower shell rises in the collar, which stops the rotation of the collar around its axis of articulation, and limits the flexure of the collar forwards, because of the rigidity of the front and rear walls of the upper part of the lower shell, which cooperate with the inner walls of the collar. This flex, or property of rigidity in flexure, is generally measured by a flex index, as previously explained. It should be noted that the sole 5 of the outer shell does not participate in the definition of the flex, or participates only slightly, but participates in the definition of the rigidity of the lower part of the lower shell, which is important for reasons of standards.

A ski boot element is defined as being all or part of the shell, the lower shell, the collar, or the tongue, or also the sole, comprising at least part of the outer wall of the rigid shell of the boot, thus participating in the definition of the flex of the boot. Thus, the ski boot element forms at least part of a lateral and/or frontal and/or rear wall of the ski boot, or, to a lesser extent, a lower wall of the ski boot. The thickness of the wall can be between 1 mm and 15 mm inclusive. This element, which contributes to defining the flex (the rigidity in flexure) of the boot can be deformed or constrained under the effect of a flexure force exerted by the leg of a skier on the ski boot.

According to the embodiment of the invention, the ski boot element is the lower shell and/or the collar, produced by means of an injection process. In particular, the ski boot element comprises a material 10 comprising a polymer 11 and a filler mixed with the polymer. In the embodiment envisaged, the wall of the two, lower shell and collar elements is integrally formed from this material 10.

The polymer can be polyurethane, and in particular polyurethane with a density of between 1 and 1.5 $g/cm^3$, and in particular between 1.1 and 1.2 $g/cm^3$. As a variant, the polymer could also be any other thermoplastic material, such as a polypropylene, a polyamide, a polycarbonate, a polyetherimide, a polyphenylsulphone, or also a styrene polymer such as ABS.

The filler comprises hollow glass microballs 12. The glass microballs 12 advantageously have a mean diameter of between 15 and 25 μm, and in particular a mean diameter of approximately 20 μm. The diameter of all the glass microballs is not necessarily identical. Certain glass microballs can be more or less large, or not have a perfectly spherical form. "Mean diameter" means the mean of the diameters of all of the microballs of the filler. In the case of a microball which is not perfectly spherical, the diameter of a microball can be defined as the mean of all the diameters of the microball, or the diameter of the sphere in which the microball is inscribed. The glass microballs are hollow spheres full of air. The glass can be borosilicate, in particular borosilicate of soda and lime. Borosilicate, and in particular borosilicate of soda and lime is resistant to water. The contact of the ski boot with snow is therefore not liable to damage the glass microballs. In all cases, the density of the filler is less than the density of the polymer, whereas the rigidity of the filler is greater than that of the polymer.

The thickness of a wall of a microball can be globally regular, and between 0.5 and 1.5 μm. The total volume of a glass microball is therefore mostly occupied by air. The density of the glass microballs 12 is between 0.30 and 0.60 $g/cm^3$, and in particular the density can be approximately 0.46 $g/cm^3$. It should be noted that the density of the borosilicate is approximately 2.3 $g/cm^3$. Thanks to their spherical form, the glass microballs 12 have high resistance to compression, i.e. resistance to compression of 1000 bars or more, or of 1100 bars or more.

Figure 2:
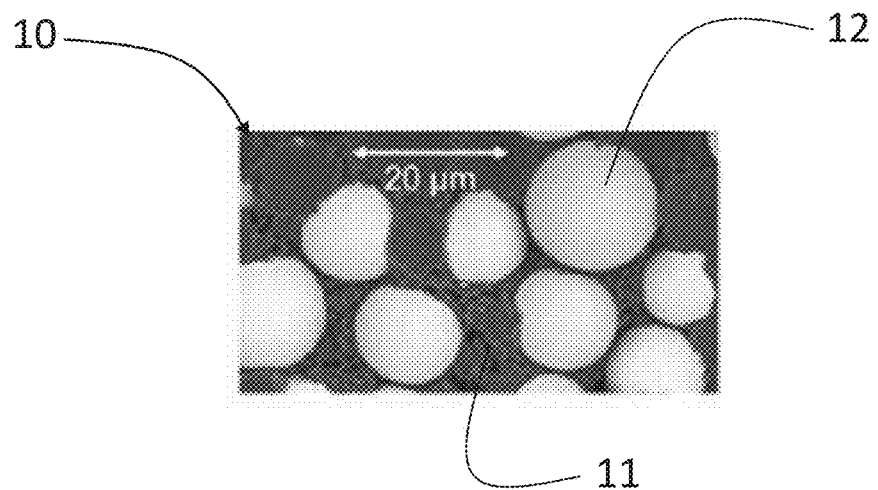
FIG. 2 is a microscopic view of a material implemented according to an embodiment of the invention.

The glass microballs 12 are mixed with the polymer 11: this assembly forms the material 10 which can be implemented in a process of injection of the element in order to form all or part of the wall of the ski boot element. FIG. 2 represents a micrographic view in cross-section of this material 10. The glass microballs 12 in the middle of the polyurethane can be distinguished clearly. The glass microballs are spaced from one another and completely coated with polyurethane.

By means of the addition of this filler formed by the hollow glass microballs 12, the rigidity of the ski boot element is greater than the rigidity of an element which would have the same form and would be constituted only by the polymer 11. It is also found that the use of this filled polymer makes it possible to increase the flex of a ski boot in comparison with the same boot with a similar/identical geometry and wall thicknesses, which would be obtained with a material without glass microballs. This increase in the flex of the ski boot makes it possible to conceive of a plurality of modifications of ski boots. If the manufacturer wishes to give precedence to the comfort of the ski boot, he can envisage a reduction in the thickness of the walls of the element, whilst maintaining the flex of the ski boot at the same value, and also reducing the total weight of the boot. As a variant, the manufacturer can envisage the use of a less rigid polymer, which is for example less expensive, and can compensate for the loss of rigidity by the incorporation of glass microballs in order to maintain a flex value identical to that of the boots of the prior art. Finally, the material selected in order to produce the boot element naturally makes it possible to increase the flex easily, and thus the rigidity in flexure from the rear towards the front of a ski boot.

In addition, it should be noted that, because of the rigidity of a material of this type, it can advantageously be disposed in the wall of the ski boot at areas which are subjected to high levels of stress, such as, for example, the lower part of the lower shell, in particular at the sole and/or the front and/or rear curbs 7.

In addition, thanks to the presence of air inside the glass microballs, their density is distinctly lower than the density of the polyurethane (the density of the polyurethane being between 1.1 $g/cm^3$ and 1.2 $g/cm^3$). Thus, the more the proportion of glass microballs is increased, the lighter the material obtained. The solution selected thus has the second advantage of making it possible to obtain lightening of an element of a ski boot, and consequently of a ski boot. In addition, the air contained in the glass microballs acts as thermal insulation. The solution selected thus has the additional advantage of increasing the thermal insulation of the outer shell of the ski boot.

Figure 3:
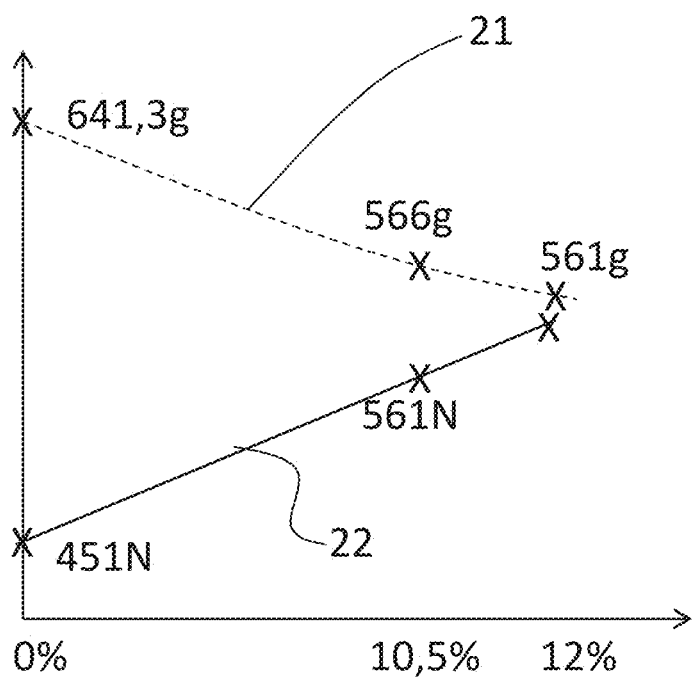
FIG. 3 is a graph of development of physical properties of the material constituting a ski boot shell, according to its composition.

FIG. 3 illustrates by means of a first curve 21 in a broken line the development of the mass of an outer shell of a ski boot entirely moulded with polyurethane comprising a variable proportion of glass microballs 12. It is found for example that the incorporation of glass microballs in the polyurethane in a proportion of 10.5% by weight makes possible a saving in mass of approximately 12% of the original mass of a shell without microballs. The incorporation of glass microballs in the polyurethane in a proportion of 15% by weight makes possible a saving in mass of approximately 100 g for a shell weighing 641.3 g without glass microballs.

In addition, FIG. 3 illustrates by means of a second curve 22 in a solid line the development of the flex of a downhill ski boot according to the percentage of glass microballs present in the polyurethane. It will be noted that the flexure force necessary to incline the collar 2 relative to the lower shell 3 increases substantially linearly with the proportion of glass microballs. Advantageously, the proportion of glass microballs 12 is between 5% and 25% inclusive, or between 10% and 15% inclusive of the weight of the element.

Advantageously, the material 10 will be selected such as to maintain a habitual rigidity of the outer shell of a ski boot. According to the invention, it is considered that the plastic material obtained is rigid when its modulus flexure is 100 MPa or more. It can be noted that this gives rise to a material with rigidity greater than, or equal to, that of a polyurethane shell with a hardness equal to 45 Shore D. Thus, the material 10 advantageously has a hardness of between 45 and 65 Shore D, and preferably between 50 and 60 Shore D. This means that the polymer material 11 used also advantageously has a hardness greater than, or equal to, that of a polyurethane shell with a hardness equal to 45 Shore D. It can also have a hardness of between 50 and 60 Shore D. In addition, the modulus of flexure of the polymer material 11 used is advantageously between 100 and 200 MPa inclusive. The polymer material 11 used is thus rigid. The sports boot element according to the invention is thus an element comprising at least one rigid wall part, i.e. it has rigidity which is distinctly greater than a rubber for example.

In addition, in the event of an impact between the ski boot element, for example after a fall by the user, the glass microballs contained in the element can break. Thus, at least part of the energy of the impact can be absorbed by the element. The foot and/or the leg of the user can thus be protected against injury.

Figure 4:
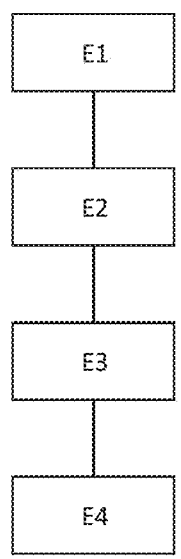
FIG. 4 is a first flowchart of a process for production of a sports boot element according to an embodiment of the invention.

The invention also relates to a process for production of a ski boot element of this type, as illustrated schematically by FIG. 4. In a first step E1, glass microballs as previously defined are provided. The glass microballs can then optionally be subjected to surface treatment in order to increase their resistance, and/or in order to improve their compatibility with the polymer used.

In a second step, known as the step E2 of granulation, the material 10 is produced by the incorporation of glass microballs 12 into a polymer 11, preferably a thermoplastic material. According to the embodiment, the resulting material 10 is then in the form of granules comprising the glass microballs coated with polyurethane mixed with polyurethane. The granules can be in the shape of cylinders or grains of rice, or can be spherical, and can have dimensions of approximately a millimetre. The step E2 of granulation can be carried out by means of a twin-screw extruder.

In a step E3 of injection, the material 10 is injected into an injection mould. For this purpose, the granules are heated to a temperature which makes it possible to make the polyurethane melt. The glass balls withstand the temperature necessary for the injection, and maintain their initial form, generally in the shape of a sphere. The glass microballs then act as a conveyor belt, and assist the flow of the material into the mould. The material can thus penetrate rapidly and efficiently into the various recesses of the moulds. The speed of the injection also permits good homogeneity of the temperature of the material in the mould. This results in a high-quality injected element, without defects of filling, shrinkage (or shrinkage holes) or warping. Elements with a complex geometry can thus easily be moulded. A lower injection temperature and/or injection pressure can also be envisaged.

Despite their high resistance to compression, glass microballs may break during the step E2 of granulation or during the first step E3 of injection. In order to anticipate the breakage of certain glass microballs, a higher proportion of glass microballs can be used for the production of the material. For example, during the granulation step, it is possible to use a proportion of approximately 25% glass microballs relative to the total weight of the material produced.

According to a variant embodiment, the production process comprises at least one second step E4 of injection of material different from the material 10 implemented during the step E3. The second material can be a polymer provided with fillers, for example hollow glass microballs with a dimension or density different from the glass microballs implemented previously. The second material could also be a polymer filled with glass fibres or carbon fibres, or a non-filled polymer. The second step E4 of injection can be carried out in the same injection mould according to a principle of co-injection, comprising injection in close succession of two materials through the same injection mould, or optionally in another mould according to an over-injection principle. As a variant, this second material could be injected before the implementation of the injection of the material according to the invention in step E3 of the method according to the invention. Thus, the physical properties of the material comprising the glass microballs can be combined with the physical properties of a second material.

It is apparent from the foregoing information that the invention makes it possible to produce a ski boot element comprising at least part of a wall comprising a polymer material filled with hollow glass microballs. As a variant, the microballs can be obtained from different natural or synthetic materials. For example, apart from glass microspheres, it would be possible to envisage polymer microspheres (plastic microballs in particular), such as polyethylene or polystyrene, or also ceramic microspheres. Advantageously, this wall part comprises this material throughout its thickness. As a variant, this material extends through only part of the thickness which is in the form of a multilayer structure. In addition, the material could comprise another filler as well as glass microballs, for example glass fibres, in particular very short glass fibres.

The invention has been presented in particular for a downhill boot, in order to form a ski boot element, and in particular in order to form a wall of a lower shell and/or a collar so as to obtain a flex or optimal rear to front rigidity. This invention can also be envisaged for:

forming a more rigid localised area of part of a boot, for example the curbs of a ski boot sole, or rear or lateral reinforcements of the wall of the boot part, in particular a shell or a collar;

forming a lighter sole of a ski boot shell, whilst maintaining sufficient rigidity, optionally including front and/or rear curbs;

forming a plastic element of a cross-country ski boot, such as, in particular, a rear stiffener extending at the rear and/or on the lateral sides of the boot and/or a collar articulated on this stiffener. In this case, it is the rigidity in lateral flexure of the boot which is optimised.

In addition, the invention is naturally adapted for all sliding sports boots, comprising a part made of rigid plastic material, the flexure property of which requires optimisation, and lightness of which is advantageous.

The invention claimed is:

1. A sports boot element comprising all or part of a wall designed to form at least part of a lateral and/or frontal and/or rear and/or lower wall of a sports boot, wherein the all or part of the wall comprises a material comprising a thermoplastic polyurethane and a hollow glass microball filler mixed with the thermoplastic polyurethane, and wherein the all or part of the wall comprising the thermoplastic polyurethane and the hollow glass microball filler is a rigid wall, said thermoplastic polyurethane having a modulus of flexure of from 100 MPa and 200 MPa; wherein the hollow glass microballs have at least one selected from the group consisting of: a mean diameter of from 15 to 25 um, and a density of from 0.30 to 0.60 g/cm$^3$.

2. The sports boot element according to claim 1, wherein the all or part of the wall comprises a proportion of hollow glass microballs of from 5% to 25% of the weight of the all or part of wall of the sports boot element.

3. The sports boot element according to claim 2, wherein
   a density of the filler is less than a density of the thermoplastic polyurethane, and
   a rigidity of the filler is greater than a rigidity of the thermoplastic polyurethane.

4. The sports boot element according to claim 1, wherein the hollow glass microballs are resistant to a compression of 1000 bars.

5. The sports boot element according to claim 1, wherein the all or part of the wall comprising the thermoplastic polyurethane and the filler of hollow glass microballs has a rigidity greater than, or equal to, the rigidity of an element with the same form constituted only by a polyurethane with a hardness of 45 Shore D.

6. The sports boot element according to claim 1, wherein
   a density of the filler is less than a density of the thermoplastic polyurethane, and
   a rigidity of the filler is greater than a rigidity of the thermoplastic polyurethane.

7. The sports boot element according to claim 6, wherein at least one selected from the group consisting of:
   the thermoplastic polyurethane has a hardness greater than, or equal to, 45 Shore D,
   the thermoplastic polyurethane has a hardness of between 50 and 60 Shore D inclusive, and
   the thermoplastic polyurethane comprises a modulus of flexure of from 100 to 200 MPa.

8. The sports boot element according to claim 1, wherein the hollow glass microball filler mixed with the thermoplastic polyurethane is configured to contribute to rigidity in flexure of the sports boot.

9. The sports boot element according to claim 8, which is configured to contribute to form all or part of at least one selected from the group consisting of an outer shell, a lower shell, a collar, and a tongue of the sports boot.

10. The sports boot element according to claim 1, which forms at least one selected from the group consisting of:
    all or part of a boot sole, and
    at least one sports boot curb.

11. A ski boot comprising at least one sports boot element according to claim 1.

12. The ski boot according to claim 11, comprising
    a collar which is articulated on a lower shell, wherein at least one selected from the group consisting of the collar and the lower shell is a boot element according to claim 1.

13. A process for production of the sports boot element according to claim 1, comprising: injecting in an injection mould a material comprising a thermoplastic polyurethane and a hollow glass microball filler, so as to obtain the sports boot element.

14. The process for production of a sports boot element according to claim 13, comprising:
    performing a granulation comprising the production of the material by incorporation of hollow glass microballs into a thermoplastic polyurethane, wherein the granulation comprises coating microballs with a layer of the thermoplastic polyurethane material.

15. The process for production of a sport boot element according to claim 13, comprising performing a second injection of a second material, different from said material, in the same injection mould, according to a principle of co-injection or over-injection.

16. The sports boot element according to claim 1, wherein the all or part of wall comprises a proportion of hollow glass microballs of from 10% to 15% of the weight of the all or part of wall of the sports boot element.

17. The sports boot element according to claim 1, wherein the hollow glass microballs are resistant to a compression of 1100 bars.

18. A sports boot element comprising all or part of a wall designed to form at least part of a lateral and/or frontal and/or rear and/or lower wall of a sports boot, wherein the all or part of the wall comprises a material comprising a thermoplastic polyurethane and ii) a hollow glass microball filler mixed with the thermoplastic polyurethane, wherein a density of the hollow glass microball filler is less than a density of the thermoplastic polyurethane, and a rigidity of the hollow glass microball filler is greater than a rigidity of the thermoplastic polyurethane; wherein the hollow glass microballs have at least one selected from the group consisting of: a mean diameter of from 15 to 25 um, and a density of from 0.30 to 0.60 g/cm$_3$.

* * * * *